United States Patent [19]

Ise

[11] Patent Number: 4,976,329

[45] Date of Patent: Dec. 11, 1990

[54] WHEEL ACCELERATION SLIP CONTROL APPARATUS IN A VEHICLE BRAKE SYSTEM

[75] Inventor: Kiyotaka Ise, Susono, Japan

[73] Assignee: Toyota Jidosha Kabushiki Kaisha, Aichi, Japan

[21] Appl. No.: 406,362

[22] Filed: Sep. 12, 1989

[30] Foreign Application Priority Data

Sep. 30, 1988 [JP] Japan .................................. 63-248722

[51] Int. Cl.⁵ ............................................. B60K 28/16
[52] U.S. Cl. ..................................... 180/197; 303/100; 364/426.03
[58] Field of Search ......................... 180/197, 233–248; 303/91, 100, 110, 97, 99, 108, 109, 102, 103, 105, 106; 364/426.01, 426.02, 426.03; 192/1.21

[56] References Cited

U.S. PATENT DOCUMENTS

| 4,811,808 | 3/1989 | Matsumoto et al. | 180/197 |
| 4,850,656 | 7/1989 | Ise et al. | 180/197 X |
| 4,866,623 | 9/1989 | Ise et al. | 180/197 X |
| 4,932,726 | 6/1990 | Iwata et al. | 303/100 |

FOREIGN PATENT DOCUMENTS

| 60-56662 | 4/1985 | Japan . |
| 61-24655 | 2/1986 | Japan . |
| 62-199488 | 2/1989 | Japan . |

Primary Examiner—Douglas C. Butler
Attorney, Agent, or Firm—Oliff & Berridge

[57] ABSTRACT

An apparatus for applying brake to right and left drive wheels to reduce slip of the wheels upon detection of the slipping conditions of the wheels under acceleration. The apparatus has a target determining device for determining the manners or modes of applying the brakes to the two drive wheels in different fashions. For one of the two drive wheels which has a comparatively large slipping tendency, a nominal control mode corresponding to the detected slipping condition is selected. The control mode for the wheel having a low slipping tendency, a mode different from a nominal mode corresponding to the detected slipping condition is used, under predetermined conditions, so that the actually used control mode is closer to the nominal mode used for the wheel having the large slipping tendency, in order to assure an optimum compromise between the drivability or acceleration of the vehicle and the avoidance of the wheel slipping condition. The degree in which the actually used control mode of the wheel having the low slipping tendency is close to the nominal control mode of the other wheel differs depending upon the difference between the nominal modes of the two wheels corresponding to the detected slipping conditions.

10 Claims, 7 Drawing Sheets

| WHEEL SPEED / WHEEL ACCELERATION | $Wrr, Wrl \leqq G1$ | $G1 < Wrr, Wrl < G2$ | $Wrr, Wrl \geqq G2$ |
|---|---|---|---|
| $Vrr, Vrl \geqq Vt1$ | SU | FU | FU |
| $Vt2 \leqq Vrr, Vrl < Vt1$ | H | SU | FU |
| $Vt3 \leqq Vrr, Vrl < Vt2$ | SD | H | SU |
| $Vf \leqq Vrr, Vrl < Vt3$ | FD | SD | H |
| $Vrr, Vrl < Vf$ | FD | FD | FD |

FIG.7(a)  WHEEL SPEED

FIG.7(b)  WHEEL ACCELERATION

FIG.7(c)  CONTROL TARGET FOR RIGHT REAR WHEEL 16

FIG.7(d)  CONTROL TARGET FOR LEFT REAR WHEEL 14
—— CONTROL TARGET SELECTED IN STEP S7 OR S8
---- FINAL CONTROL TARGET DETERMINED IN STEP S10

FIG.7(e)  WHEEL CYLINDER PRESSURE

FIG.8

WHEEL ACCELERATION SLIP CONTROL APPARATUS IN A VEHICLE BRAKE SYSTEM

BACKGROUND OF THE INVENTION

1. Field of the Invention

The present invention relates in general to a wheel acceleration slip control apparatus in a vehicle brake system, and more particularly to an apparatus for applying brake to the drive wheels of a vehicle for preventing excessive slipping of the drive wheels during acceleration thereof.

2. Discussion of the Prior Art

When the drive wheels of a vehicle are accelerated (upon starting of the vehicle, for example), the drive wheels may slip on the road surface. To avoid excessive slipping of the drive wheels during acceleration thereof (hereinafter referred to as "acceleration slip" or "wheel acceleration slip", when appropriate), the brake system of some vehicles is provided with a brake control apparatus for applying brake to the drive wheels when an excessive slipping condition of the drive wheel or wheels is detected during acceleration of the drive wheels. An example of such a wheel acceleration slip control apparatus is disclosed in laid-open Publication No. 61-24655 of unexamined Japanese Patent Application. In this wheel acceleration slip control apparatus, brake cylinders for the right and left drive wheels are controlled independently of each other. When brake is applied to one of the two drive wheels upon detection of an excessive slipping condition of that one drive wheel, the rotating speed of the other drive wheel rises due to the function of the differential gear of the vehicle. As a result, this other drive wheel having a low slipping tendency tends to be in an excessively slipping condition. If brake is applied to this excessively slipping drive wheel, the amount of slip of the above-indicated one drive wheel tends to increase again. Thus, the brake applications to the one or other drive wheel so as to reduce or eliminate the slipping condition of the drive wheels may cause a slipping condition of the drive wheel which has not been braked. This phenomenon associated with the wheel acceleration slip will be referred to as "acceleration slip control interference" between the right and left drive wheels, when appropriate. The acceleration slip control interference may deteriorate the accuracy of control of the drive wheel brakes.

Another laid-open Publication No. 60-56662 of unexamined Japanese Patent Application discloses a wheel acceleration slip control apparatus, in which upon detection of an excessive slipping condition of one of the two drive wheels, brakes are applied to both of the drive wheels. While the brake applications to the two drive wheels may avoid the acceleration slip control interference indicated above, the drive force of the drive wheel having a comparatively low slipping tendency (hereinafter referred to as "low slipping tendency drive wheel" when appropriate) is unnecessarily restrained or limited, whereby the vehicle acceleration is unnecessarily lowered due to the brake application to the low slipping tendency drive wheel.

In the light of the above drawbacks of the known wheel acceleration slip control apparatus, the assignee of the present application proposed an improved wheel acceleration slip control apparatus as disclosed in laid-open Publication No. 64-44368 of unexamined Japanese Patent Application (published on Feb. 16, 1989), in an attempt to avoid both the acceleration slip control interference between the two drive wheels and the unnecessary reduction in the vehicle acceleration. This wheel acceleration slip control apparatus includes (a) a right and a left wheel brake for applying brake to the right and left drive wheels, independently of each other, (b) slip detecting means for detecting slipping conditions of the drive wheels upon acceleration of the drive wheels, (c) target determining means for determining control targets for controlling the right and left wheel brakes, based on the slipping conditions of the slip detecting means, and (d) brake control means for operating the right and left wheel brakes according to the control targets determined by the target determining means, so as to reduce the degree of slip of the drive wheels. The target determining means determines the control targets for the two drive wheels, which correspond to the detected slipping conditions of the drive wheels. The thus determined control target for the low slipping tendency drive wheel is compensated or adjusted so that the final control target to be eventually used for controlling the corresponding wheel brake is closer to the determined control target for the other drive wheel (which has a comparatively large slipping tendency). Namely, the nominal control target for the low slipping tendency drive wheel is compensated by a predetermined amount so that the difference between the final control targets for the two drive wheels is reduced as compared with that prior to the compensation. This arrangement may avoid the acceleration slip control interference, while preventing unnecessary lowering of the vehicle acceleration due to reduction of the drive force of the low slipping tendency drive wheel.

However, the above proposed wheel acceleration slip control apparatus still suffers from a problem which is experienced under certain situations. That is, the solution provided by the proposed apparatus is not sufficient in eliminating both of the two conventionally encountered drawbacks, i.e., the lowering of the vehicle acceleration, and the acceleration slip control interference between the two drive wheels.

For instance, the amount of adjustment or compensation of the nominal control target for the low slipping tendency drive wheel is set to be comparatively large, if it is assumed that the coefficient of friction of the road surface is relatively low and is even for the right and left drive wheels. In one exemplary form of the wheel acceleration slip control apparatus, the pressure in each of the wheel cylinders for the right and left drive wheels is controlled in a selected one of five different pressure control modes, i.e., a fast increase mode, a slow increase mode, a pressure hold mode, a slow decrease mode and a fast decrease mode. These control modes are consecutively numbered in the order of description, that is, in the order of the magnitude of an effect of reducing the degree of slip of the drive wheels. In this case, for example, the nominal pressure control mode corresponding to the detected slipping condition of the low slipping tendency drive wheel may be replaced by a final pressure control mode which is two steps closer to the nominal and final pressure control mode of the other drive wheel, so that the difference between the numbers of the final pressure control modes is comparatively small. This arrangement is suitable because the two drive wheels should not have a large difference in the drive force since the friction coefficient of the road surface is even for the two drive wheels. Further, the above arrangement which uses the final control targets relatively close to each other is desirable because the drive wheels tend to easily suffer from the acceleration slip control interference since the friction coefficient of the road surface is relatively low. In this case, however, the vehicle acceleration is deteriorated when the vehicle actually runs on a road surface which has considerably different friction coefficients in right and left areas corresponding to the right and left drive wheels. Suppose the nominal pressure control modes for the two drive wheels are the "fast increase" and "slow decrease" modes, respectively, the final pressure control modes eventually used for the drive wheels are the "fast increase" and "slow increase" modes, respectively. In other words, the pressure in the wheel cylinder for the low slipping tendency drive wheel is controlled in the slow increase mode. This unnecessarily limits the drive force of the low slipping tendency drive wheel running on the area of the road surface which has the comparatively high friction coefficient. Accordingly, the vehicle acceleration is lowered. Further, the acceleration slip control interference will not easily take place on the road surface having different friction coefficients in the right and left areas, since the drive wheel running on the road surface area having the comparatively high friction coefficient will not easily slip even if the drive forces of the two drive wheels are considerably different from each other. In other words, it is not required that the final control target or pressure control mode for the less slipping tendency drive wheel be relatively close to that for the comparatively seriously slipping drive wheel. As explained above, the drive force of the low slipping tendency wheel and the vehicle acceleration are unnecessarily limited or reduced, according to the above arrangement wherein the amount of adjustment or compensation of the nominal control target to determine the final control target for the low slipping tendency drive wheel is set to be relatively large, assuming that the friction coefficient of the road surface is relatively low and is even for the right and left drive wheels.

If the amount of compensation to determine the final control target for the low slipping tendency drive wheel is set to be relatively small, in view of the road surface having different friction coefficients, the difference between the final control targets for the right and left drive wheels tends to be excessively large and the acceleration slip control interference tends to easily occur, where the vehicle runs on a road surface having a relatively low and even friction coefficient.

SUMMARY OF THE INVENTION

It is therefore an object of the present invention to provide a wheel acceleration slip control apparatus for a vehicle, which assures an optimum compromise between the vehicle acceleration (avoidance of unnecessary reduction of the drive force of the low slipping tendency drive wheel) and the avoidance of the slipping condition of the drive wheels (avoidance of the "acceleration slip control interference" between the two drive wheels), irrespective of the road surface condition in terms of its friction coefficient.

The above object may be achieved according to the principle of the present invention, which provides a wheel acceleration slip control apparatus for a vehicle, for applying brakes to right and left drive wheels of the vehicle upon detection of an excessive slip of the drive wheels, comprising: (a) a right and a left wheel brake for applying brake to the right and left drive wheels, independently of each other; (b) slip detecting means for detecting slipping conditions of the right and left drive wheels, upon acceleration of the drive wheels; (c) target determining means for determining a first and a second control target for controlling the right and left wheel brakes so as to reduce degrees of slip of the right and left drive wheels, respectively, depending upon the slipping conditions of the right and left drive wheels detected by the slip detecting means, respectively; and (d) brake control means for operating the right and left wheel brakes according to the first and second control targets determined by the target determining means, respectively. The target determining means determines the first and second control targets, each based on nominal control targets which correspond to the slipping conditions of the right and left drive wheels detected by the slip detecting means. One of the first and second control targets for one of the drive wheels which has a less slipping tendency ("low slipping tendency drive wheel") is determined such that the nominal control target of the low slipping tendency drive wheel is changed to a final control target which is closer to the nominal control target of the other drive wheel so that a first difference between the final control target of the low slipping tendency drive wheel and the nominal control target of the other drive wheel is not smaller than a predetermined amount, in a first case where a second difference between the nominal control targets of the low slipping tendency drive wheel and the other drive wheel exceeds the predetermined amount. In a second case where the second difference is equal to or smaller than the predetermined amount, the control target for the low slipping tendency drive wheel is determined such that the first difference is smaller than that in the first case. The target determining means uses the final control target of the above-indicated drive wheel and the nominal control target of the other drive wheel as the one and the other of the first and second control targets, respectively.

In the wheel acceleration slip control apparatus of the present invention constructed as described above, the nominal control target corresponding to the detected slipping condition of the drive wheel having the comparatively high slipping tendency is used as the final control target, in both of the first and second cases. In the first case where the difference between the nominal control targets of the two drive wheels having the low and high slipping tendencies exceeds the predetermined amount, the final control target for the low slipping tendency drive wheel is determined such that the difference between the final control targets for the two drive wheels is smaller than that between the nominal control targets and is not smaller than the predetermined amount. This arrangement is more effective to avoid the acceleration slip control interference, than the conventional arrangement in which the nominal control targets corresponding to the detected slipping conditions of the drive wheels are both used as the final control targets. Further, there still exists a difference between the final control targets for the drive wheels having the comparatively low and high slipping tendencies, whereby the unnecessary reduction in the drive force of the low slipping tendency drive wheel can be effectively avoided. Therefore, by suitably determining the predetermined amount of the difference between the two nominal control targets, the pressures in the wheel cylinders for the right and left drive wheels can be controlled in an adequate manner, irrespectively of whether the road surface has a low and even friction coefficient, or considerably different local friction coefficients corresponding to the two drive wheels.

In the first case where the difference between the nominal control targets of the two drive wheels exceeds the predetermined amount, the final control target of the low slipping tendency drive wheel is determined in one of the following three manners:

(a) so that the difference between the two final control targets is equal to the predetermined amount;

(b) so that the difference between the nominal and final control targets of the low slipping tendency drive wheel is a fixed amount not smaller than the predetermined amount indicated above; and (c) so that the difference identified at b) above is proportional to the difference between the nominal control targets of the two drive wheels.

In the second case where the difference between the nominal control targets of the two drive wheels is equal to or smaller than the predetermined amount, the final control target of the low slipping tendency drive wheel is determined in one of the following two manners:

(i) so that the final control target is the same as the nominal control target; and (ii) so that the difference between the nominal and final control targets of the low slipping tendency drive wheels is smaller than that in the first case.

Thus, a total of six combinations are available for determining the final control target of the less slipping tendency drive wheel. According to the combinations (a)-(i), (b)-(i) and (b)-(ii), the nominal control target of the low slipping tendency drive wheel is replaced by the final control target, so that the difference between the final control targets of the two drive wheels does not exceed the predetermined amount.

The target determining means may be adapted to first determine the nominal control target of the less slipping tendency drive wheel, and then replace the thus determined nominal control target with the final control target. However, the two final control targets of the two drive wheels may be determined directly from the detected slipping conditions of the two drive wheels, according to a suitably prepared relationship between the final control targets and the detecting slipping conditions of the low slipping tendency drive wheel.

In one form of the present invention, the target determining means determines the first and second control targets, each based on a plurality of nominal control targets which correspond to respective slipping conditions of the drive wheels, and which are numbered consecutively in the order of an effect of reducing the degrees of slip of the drive wheels when the nominal control targets are used. The target determining means determines, in the first case, the control target for the low slipping tendency drive wheel such that one of the stepped control targets of the less slipping tendency drive wheel is replaced by another of the stepped control targets of the less slipping tendency drive wheel as the final control target which is closer to the stepped control target of the other drive wheel, such that the first difference is equal to a difference between numbers of the above-indicated another stepped control target of the less slipping tendency drive wheel and the stepped control target of the other drive wheel and such that the first difference is not smaller than a predetermined value as the above-indicated predetermined amount. In this case, the second difference is equal to a difference between the numbers of the stepped control targets of the less slipping tendency drive wheel and the stepped control target of the other drive wheel. The target determining means uses the above-indicated another nominal control target of the less slipping tendency drive wheel as the final control target.

In the above form of the invention, the plurality of nominal control targets may be five brake pressure control modes in which a pressure in a brake cylinder of each of the right and left wheel brakes is regulated. The five brake pressure control modes consist of a fast increase mode, a slow increase mode, a pressure hold mode, a slow decrease mode and a fast decrease mode, which modes are numbered consecutively in the order of description. The modes may be numbered so as to either increase or decrease, e.g., from "1" to "5", or from "5" to "1".

In the same form of the invention, the slip detecting means may comprise wheel speed sensing means for detecting rotating speeds of the drive wheels, wheel acceleration sensing means for detecting acceleration values of the drive wheels, and means for classifying each of the detected rotating speeds and acceleration values so as to fall in one of a plurality of ranges. In this instance, the slip detecting means is adapted to detect the slipping conditions of each of the drive wheels, as a plurality of combinations of the ranges of the detected rotating speed and acceleration value of each drive wheel, and the target determining means comprises means for selecting one of the five brake pressure control modes, depending upon one of the combinations which is detected by the slip detecting means.

In the same form of the present invention, the target determining means may be adapted to select, as the control target for the low slipping tendency drive wheel, one of the five brake control modes other than the decrease modes, when the control target for the other drive wheel is the fast increase mode. Namely, the predetermined amount defined by a difference between the numbers of the two nominal brake pressure control modes is equal to "2".

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
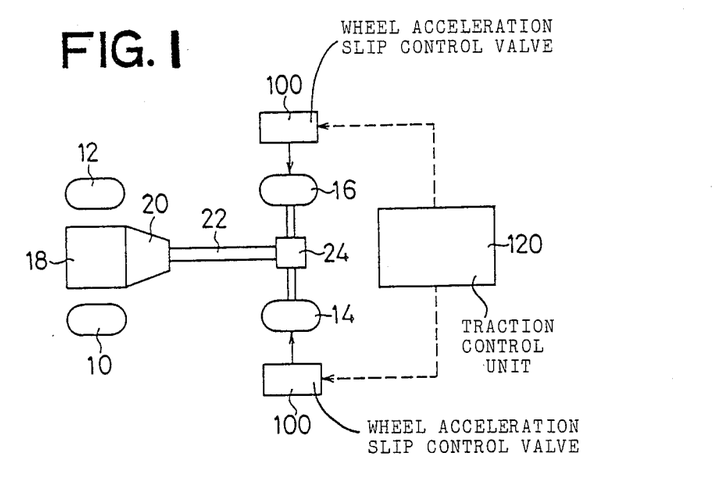
FIG. 1 is a schematic view showing a power transmitting system of a motor vehicle having a hydraulic brake system which incorporates one embodiment of a wheel acceleration slip control apparatus of the present invention.

Referring first to FIG. 1, reference numerals 10, 12, 14 and 16 respectively denote a left front wheel, a right front wheel, a left rear wheel and a right rear wheel of a motor vehicle having an engine 18 at its front portion. Power produced by the engine 18 is transmitted to the left and right rear wheels 14 and 16, through a transmission 20, a propeller shaft 22 and a differential gear 24. Thus, the present vehicle is a front-engine rear-drive type automobile. The differential gear 24 functions to distribute the drive force of the engine 18 to the left and right rear drive wheels 14, 16, while permitting different angular speeds of the two drive wheels.

Figure 2:
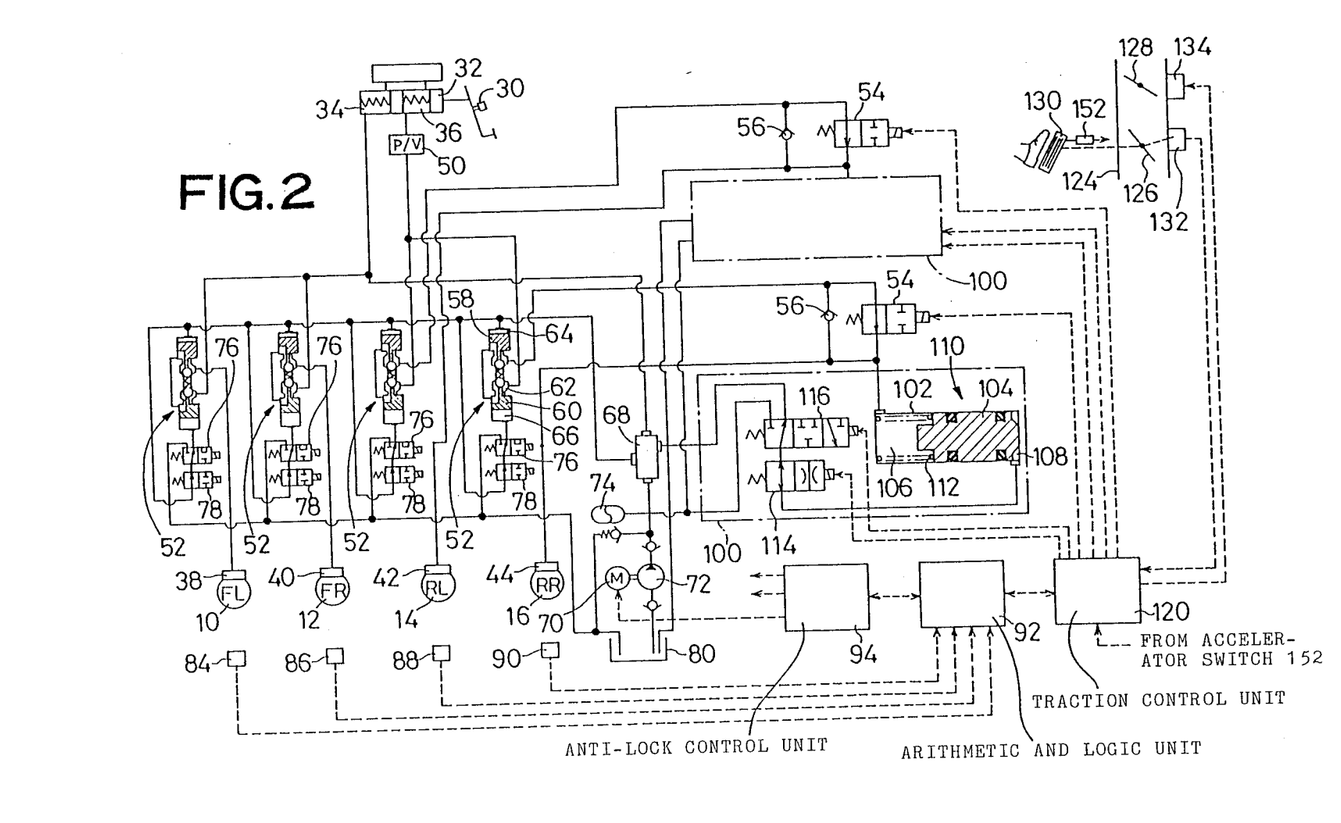
FIG. 2 is a diagrammatic view showing the hydraulic brake system incorporating the wheel acceleration slip control apparatus of FIG. 1.

The rotating motions of the wheels 10, 12, 14, 16 are restricted by a hydraulically operated brake system shown in FIG. 2. In this figure, reference numeral 30 designates a brake pedal which is operated by an operator of the vehicle. In response to an operation of the brake pedal 30, fluid pressures are developed in two mutually independent pressurizing chambers 34, 36 of a master cylinder 32. The pressure developed in the pressurizing chamber 34 is supplied to front wheel cylinders 38, 40 of respective left and right front wheel brakes of the left and right front wheels 10, 12. The pressure developed in the other pressurizing chamber 36 is supplied to rear wheel cylinders 42, 44 of respective left and right rear wheel brakes of the left and right rear drive wheels 14, 16. Thus, the brake system has two independent piping arrangements, one for the front wheels 10, 12, and the other for the rear drive wheels 14, 16. The present brake system is adapted so as to apply brakes to the four wheels 10, 12, 14, 16, in an anti-lock or anti-skid fashion, independently of each other. The anti-lock braking operation for the right rear wheel 16 will be described, by way of example.

In a fluid passage for supplying the pressurized brake fluid to the wheel cylinder 44 of the right rear wheel 16, a proportioning valve 50 and an anti-lock control valve are provided in series. Between the anti-lock control valve 52 and the wheel cylinder 44, there is provided a solenoid-operated shut-off valve 54, so that the control valve 52 and the wheel cylinder 44 are connected to and disconnected from each other, by means of the shut-off valve 54. When the pressure in the wheel cylinder 44 is controlled in an anti-lock or anti-skid fashion, the shut-off valve 54 is held in its deenergized state, keeping the anti-lock control valve 52 in fluid communication with the wheel cylinder 44. Reference numeral 56 designates a check valve provided in parallel connection with the shut-off valve 54.

The anti-lock control valve 52 has a pair of pistons 58, 60 disposed coaxially with each other within a housing. Between the two pistons 58, 60, there is formed a variable-volume chamber 62, through which the brake fluid from the master cylinder 12 is fed to the wheel cylinder 44. On one side of each piston 58, 60 remote from the variable-volume chamber 62, there is formed a pressure chamber 64, 66 to which a fluid pressure in a pressure regulator 68 is applied. As described below, the pressure regulator 68 is connected, through a wheel acceleration slip control valve 100 (which will be described), to an accumulator 74 which stores a brake fluid pressurized by a pump 72 activated by a motor 72. The pressure regulator 68 functions to convert the fluid pressure from the accumulator 74, into a controlled pressure depending upon an amount of operation of the brake pedal 30. The pressure chamber 64 of the anti-lock control valve 52 receives the fluid pressure as delivered from the regulator 68, while the other pressure chamber 66 receives the fluid pressure from the regulator 68, which is supplied through a solenoid-operated directional control valve 76 and a solenoid-operated shut-off valve 78. More specifically, the directional control valve 76 and the shut-off valve 78 operate to place the pressure chamber 66 in a selected one of three conditions, i.e., a first condition in which the chamber 66 communicates with the regulator 68, a second condition in which the chamber 66 communicates with a reservoir 80, and a third condition in which the chamber 66 is disconnected from both of the regulator 68 and the reservoir 80. Thus, while the piston 58 is held stationary, the piston 60 is moved so as to increase, hold or decrease the volume of the variable-volume chamber 62, whereby the pressure in the wheel cylinder 44 is increased, maintained or decreased.

The hydraulic arrangement described above with respect to the right rear wheel 16 substantially applies to the arrangements for the left rear wheel 42, and the left and right front wheels 10, 12. In FIG. 2, the same reference numerals as used for the hydraulic arrangement for the right rear wheel 16 are used to identify the corresponding components of the hydraulic arrangements for the wheels 10, 12, 14. In the interest of brevity, no redundant description of these components for the wheels 10, 12, 14 will be provided. It is noted, however, that the proportioning valve 50, solenoid-operated shut-off valve 54 and check valve 56 are not provided in the hydraulic arrangements for the left and right front wheels 10, 12.

Wheel speed sensors 84, 86, 88, 90 are provided to detect the rotating speeds of the wheels 10, 12, 14, 16, respectively. Outputs of these speed sensors 84, 86, 88, 90 are applied to an arithmetic and logic unit 92, so that the slip ratios of the wheels are calculated by the unit 92, based on the received output signals from the sensors 84, 86, 88, 90. The arithmetic and logic unit 92 also functions to calculate acceleration values of each wheel based on the received sensor outputs. The unit 92 is connected to an anti-lock control unit 94, so that the anti-lock control unit 94 receives from the unit 92 the signals indicative of the rotating speeds, acceleration values and slip ratios of the wheels. Based on the slip ratios of the wheels, the anti-lock control unit 94 applies control signals to the solenoid-operated valves 76, 78, so as to eliminate an excessive amount of slip of each wheel.

Each of the solenoid-operated shut-off valves 54 for the rear drive wheels 14, 16 is connected to a wheel acceleration slip control valve 100, and each of the rear wheel cylinders 42, 44 is connected to a fluid passage between the shut-off valve 54 and the wheel acceleration slip control valve 100. The control valves 100 for the two rear wheel cylinders 42, 44 have the same construction, and the control valve 100 for the right rear wheel cylinder 44 will be described in detail, by way of example. The control valve 100 includes a variable-volume unit 110, which has a piston 104 fluid-tightly and slidably received within a housing 102. The variable-volume unit 110 has two pressure chambers 106, 108 formed on the opposite sides of the piston 104, such that the pressure chamber 106 is in fluid communication with the right rear wheel cylinder 44. The piston 104 is biased by a spring 112 toward the pressure chamber 108.

To the pressure chamber 108, there are connected in series a solenoid-operated flow restrictor valve 114 and a solenoid-operated directional control valve 116. These valves 114, 116 cooperate with the variable-volume unit 110 to constitute the wheel acceleration slip control valve 100. The flow restrictor valve 114 has a restricting position for restricting a fluid flow therethrough, and a non-restricting position in which the fluid flow is not restricted. The directional control valve 116 is a three-position valve having a first position for fluid communication between the pressure chamber 108 and the reservoir 80, a second position for fluid communication between the pressure chamber 108 and the accumulator 74, and a third position in which the pressure chamber 108 is disconnected from both of the reservoir 80 and the accumulator 74. With the valves 114, 116 operated in combination, the pressure chamber 108 is selectively placed in one of five states: a first state in which the chamber 108 communicates with the accumulator 74 without a flow restriction by the valve 114; a second state in which the chamber 108 communicates with the accumulator 74 with a flow restriction by the valve 114; a third state in which the chamber 108 communicates with the reservoir 80 without a flow restriction by the valve 114; a fourth state in which the chamber 108 communicates with the reservoir 80 with a flow restriction by the valve 114; and a fifth state in which the chamber 108 is not in communication with both of the accumulator 74 and the reservoir 80. Thus, the pressure in the chamber 108 is controlled in the corresponding five different modes, i.e., rapidly increased, slowly increased, maintained or held at a given level, slowly decreased and rapidly decreased. Accordingly, the fluid pressure in the right rear wheel cylinder 44 is controlled in the corresponding five different modes: a fast increase mode, a slow increase mode; hold mode; a slow decrease mode; and a fast decrease mode.

The solenoid-operated valves 114, 116 are controlled by a traction control unit 120 connected to the arithmetic and logic unit 92. The traction control unit 120 effects a determination concerning the slipping condition of the rear drive wheel 16, based on the rotating speed and acceleration value of the wheel represented by the signals received from the arithmetic and logic unit 92. If the traction control unit 120 determines that the drive wheel 16 is slipping on the road surface due to an excessive drive force, the control unit 120 applies to the solenoid-operated valves 114, 116 appropriate signals to activate the wheel cylinder 44 so as to apply brake to the wheel 16 for reducing the degree of slip of the wheel in a manner suitable to the detected slipping condition. Thus, the slip of the wheel 16 during acceleration of the wheel is reduced or eliminated by suitably controlling the pressure in the wheel cylinder 44. During this wheel acceleration slip control operation, the solenoid-operated shut-off valve 54 is maintained in its closed position, and the wheel cylinder 44 is disconnected from the variable-volume chamber 62. In the present embodiment, the wheel acceleration slip control is also effected by controlling the output of the engine 18, while the brake is applied to the wheel 44 as described above. Described more particularly, an intake manifold 124 of the engine 18 is provided with a primary throttle valve 126 and a secondary throttle valve 128. The primary throttle valve 126 is opened by depressing an accelerator pedal 130. The opening angle of the primary throttle valve 126 is detected by a primary throttle sensor 132. Based on the detected opening angle of the primary throttle valve 126, the opening angle of the secondary throttle valve 134 is determined, and the secondary throttle valve 134 is activated by a motor 134, according to the determined opening angle. Namely, the traction control unit 120 controls the secondary throttle valve 128 and thereby regulates the output of the engine 18, during the braking operation to reduce or eliminate the slip of the wheel 16. Since this regulation of the engine output is well known in the art and is not essential to the understanding of the present invention, no further description of the engine output regulation will be provided.

Figure 3:
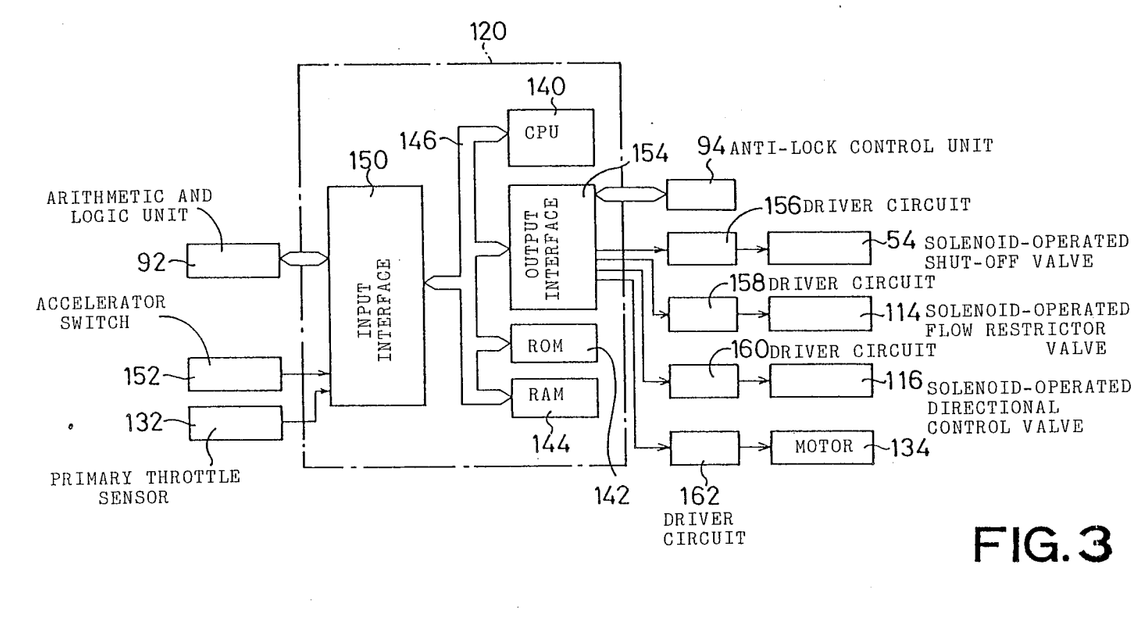
FIG. 3 is a schematic block diagram illustrating a traction control unit of the wheel acceleration slip control apparatus of FIG. 2.
Figure 4:
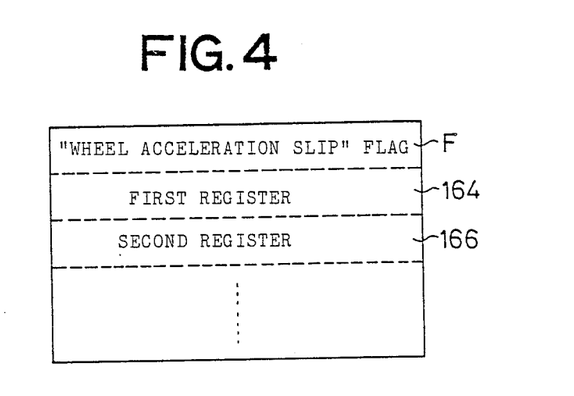
FIG. 4 is a schematic view showing a part of a RAM of a computer which constitutes a major portion of the traction control unit of FIG. 3.
Figure 5:
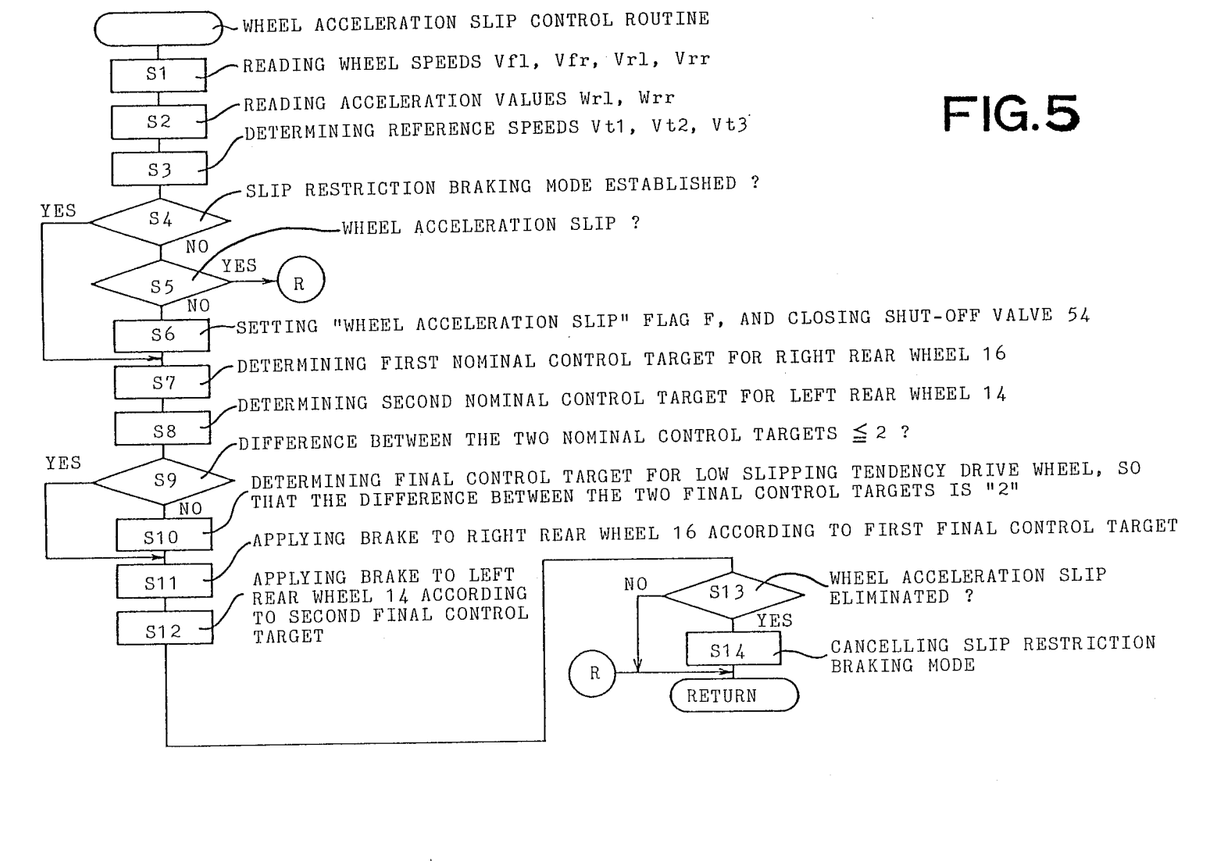
FIG. 5 is a flow chart illustrating an operation according to a wheel acceleration slip control routine stored in a ROM of the computer.
Figure 6:
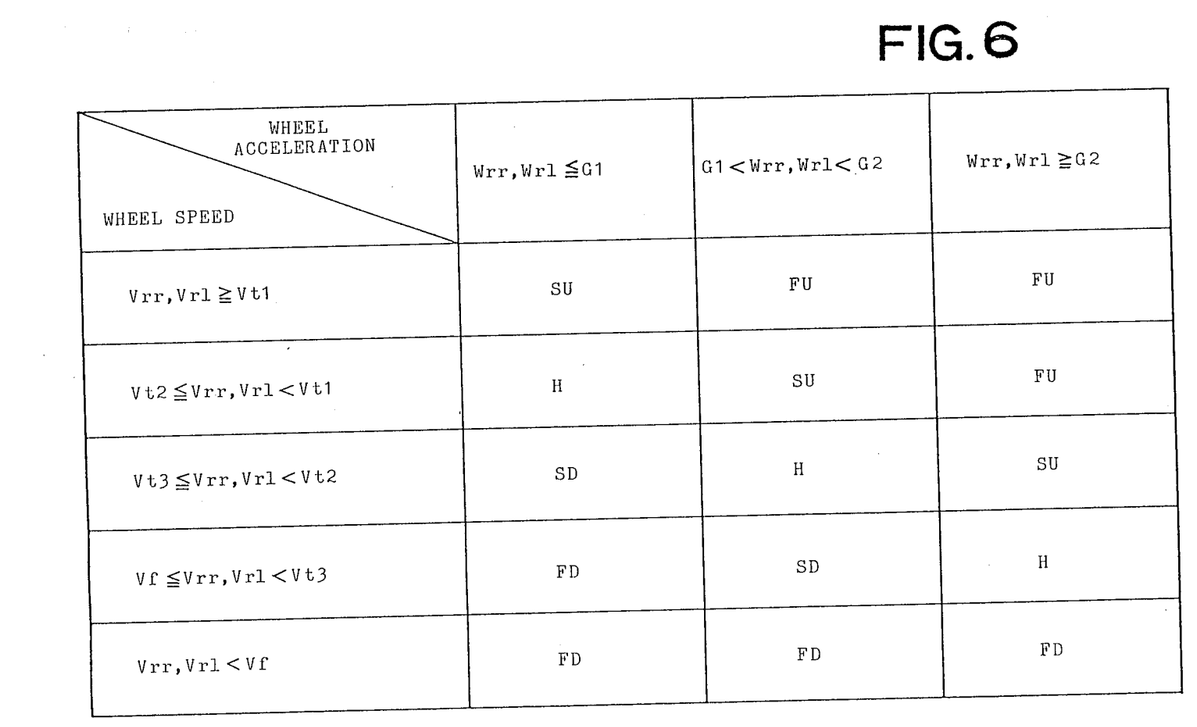
FIG. 6 is a data table stored in the ROM, for determining control targets used in the control routine of FIG. 5.
Figure 7A:
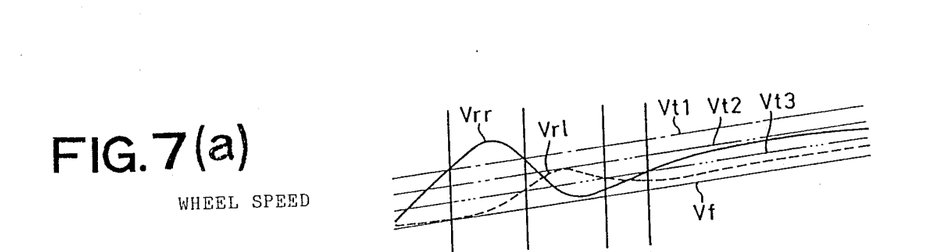
FIGS. 7(a), 7(b), 7(c), 7(d) and 7(e) are graphs illustrating the wheel acceleration slip control operation according to the control routine of FIG. 5.
Figure 7B:
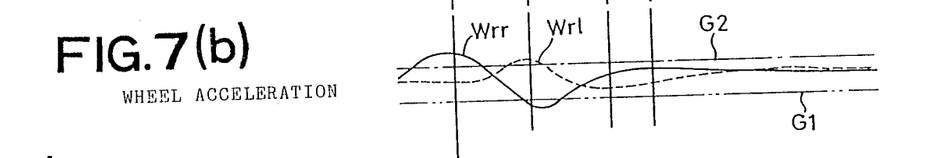
Figure 7C:
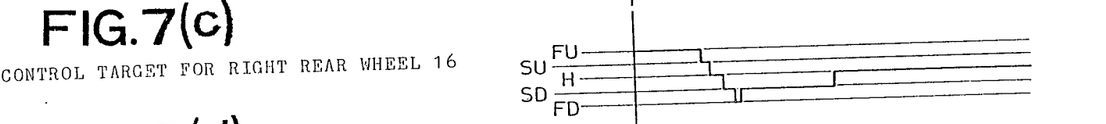
Figures 7D, 7E:
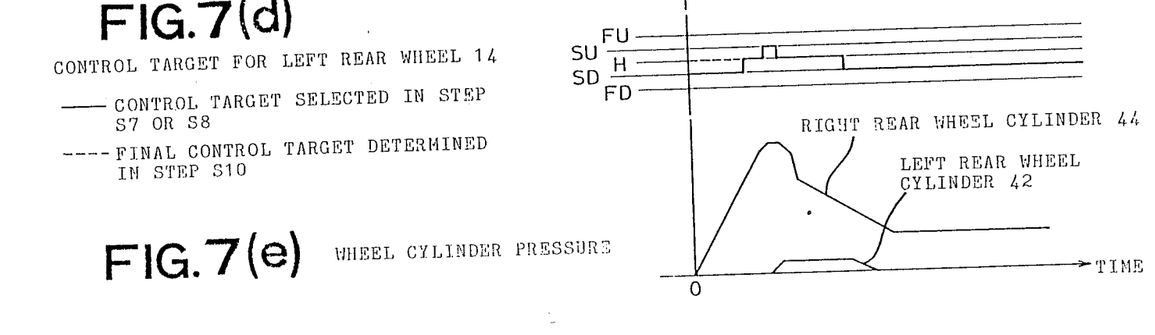

Referring next to FIG. 3, the traction control unit 120 is principally constituted by a microcomputer which includes a CPU (central processing unit) 140, a ROM (read-only memory) 142, a RAM (random-access memory) 144, and a bus 146. To the bus 146, there are connected via an input interface 150 the arithmetic and logic unit 92, the primary throttle sensor 132, and an accelerator switch 152 which detects the amount of depression of the accelerator pedal 130. To the bus 146, there are also connected via an output interface 154 the anti-lock control unit 94, and driver circuits 156, 158, 160, 162 which are adapted to activate the solenoid-operated shut-off valve, flow restrictor valve and directional control valves 54, 114, 116 and the secondary throttle valve drive motor 134, respectively. The RAM 144 includes a WHEEL ACCELERATION SLIP flag F, a first register 164 and second register 166. The ROM 142 stores various control programs such as a wheel acceleration slip control routine as illustrated in the flow chart of FIG. 5, and an engine output control routine, and a data table as indicated in FIG. 6 for determining control targets for controlling the wheel cylinders 42, 44 during execution of the wheel acceleration slip control routine of FIG. 5.

The wheel acceleration slip control routine will be described by reference to the flow chart of FIG. 5.

The wheel acceleration slip control routine is initiated by an operation of the accelerator pedal 130. The control routine is started with an initializing step (not shown) for resetting the RAM 144. For example, the WHEEL ACCELERATION SLIP flag F is reset in the initializing step. This initializing step is followed by step S1 in which the CPU 140 reads in the signals from the arithmetic and logic unit 92, which represent rotating speeds Vfl, Vfr, Vrl and Vrr of the front and rear wheels 10, 12, 14, 16, and stores these signals in the RAM 144. Step S1 is followed by step S2 in which the CPU 140 reads in the signals from the arithmetic and logic unit 92, which represent acceleration values Wrl, Wrr of the left and right rear drive wheels 14, 16, and stores these signals in the RAM 144. Then, the control flow goes to step S3 to determine reference speeds Vt1, Vt2, Vt3, by adding a predetermined amount of slip to the detected rotating speed Vf of the front wheels 10, 12. These reference speeds Vt1, Vt2, Vt3 are used for detecting the slipping conditions of the rear wheels 14, 16 and determining the corresponding control targets for controlling the rear wheel cylinders 42, 44 so as to reduce or eliminate the slipping conditions, as described below in detail. Since the rotating speeds of the rear drive wheels 14, 16 exceed the vehicle running speed when the drive wheels are slipping on the road surface, the slipping conditions of the drive wheels 14, 16 can be detected by comparing the rotating speeds Vrl, Vrr with the vehicle speed, i.e., with the rotating speeds Vfl, Vfr (Vf) of the driven wheels 10, 12. In the present embodiment, the amount of slip of the rear drive wheels 14, 16 is expressed in slip speed Km/h, and the three reference speeds Vt1, Vt2, Vt3 (Vt1>Vt2 Vt3) are obtained by adding three different amounts of slip $\Delta V1$, $\Delta V2$ and $\Delta V3$ ($\Delta V1 > \Delta V2 > \Delta V3$, e.g., $\Delta V1 = 6$ km/h, $\Delta V2 = 4$ km/h, $\Delta V3 = 2$ km/h) to the rotating speed Vf of the front wheels 10, 12.

The control flow then goes to step S4 to determine whether the WHEEL ACCELERATION SLIP flag F is in the set state or not, that is, whether a slip restriction braking mode has been established or not, or whether a slipping condition of the drive wheels 14, 16 has been detected in step S5 or not. The WHEEL ACCELERATION SLIP flag F has been reset in the initializing step, a negative decision (NO) is obtained in the first execution of step S4, and the control goes to step S5 to determine whether a slipping condition of the drive wheels 14, 16 has been detected or not. This determination is accomplished by comparing the rotating speeds Vrr, Vrl of the wheels 14, 16 with the reference speed Vt1. If at least one of the speeds Vrl and Vrr exceeds the reference speed Vt1, the CPU 140 determines that there exists a slipping condition, and makes an affirmative decision (YES) in step S5. In this case, step S5 is followed by step S6 in which the WHEEL ACCELERATION FLAG F is set and the solenoid-operated shut-off valve 54 is brought to the closed position. In the next step S7, the CPU 140 determines a first nominal control target for the right rear drive wheel 16 and stores the determined first nominal control target in the first register 164 of the RAM 144. Then, step S8 is executed to determine a second nominal control target for the left rear drive wheel 14 and stores the determined second nominal control target in the second register 166 of the RAM 144. The nominal control targets stored in the first and second registers 164, 166 may or may not be used as final control targets, as described below.

In the present embodiment, the control targets are the manners or modes in which the pressures in the rear wheel cylinders 42, 44 are controlled. As described above, the present embodiment has the five different control modes for controlling the pressures in the wheel cylinders 42, 44: fast increase mode, slow increase mode, hold mode, slow decrease mode and fast decrease mode, which are indicated by FU, SU, H, SD and FD in the table of FIG. 6. One of these five pressure control modes is selected in steps S7 and S8, according to the table of FIG. 6 which represents a relationship between the pressure control modes (control targets), and combinations of ranges of the detected rotating speeds Vrl, Vrr and calculated acceleration values Wrl, Wrr of the drive wheels 14, 16. The ranges of the detected rotating speeds of the drive wheels are defined by the reference speeds Vt1, Vt2, Vt3 and the speed Vf of the front wheels 10, 12, while the ranges of the calculated acceleration values of the drive wheels are defined by reference values G1 and G2. For example, the reference acceleration value G1 is $-9.8$ m/s$^2$ (negative acceleration, i.e., deceleration value), while the reference acceleration value G2 is $+9.8$ m/s$^2$ (positive acceleration).

For instance, if the detecting rotating speed of the right rear drive wheel 16 is intermediate between the reference speeds Vt1 and Vt2, and the acceleration value of the same wheel 16 is intermediate between the values G1 and G2, the CPU 140 selects the slow increase mode SU as the first nominal control target for the right rear wheel 16.

After the first and second nominal control targets for the two drive wheels 16, 14 have been stored in the first and second registers 164, 166 of the RAM 144, the control flow goes to step S9 to determine whether a difference between the nominal control targets stored in the first and second registers 164, 166 is equal to or smaller than a predetermined value "2". Namely, the pressure control modes FU, SU, H, FD and SD are stepped or consecutively numbered from "1" to "5", in the order of description, i.e., in the order of the effect of reducing the slip of the wheels when the wheel cylinders 42, 44 are controlled in these five different modes as the control targets.

If the difference between the identification numbers of the first and second nominal control targets or pressure control modes for the rear drive wheels 16, 14 does not exceed the predetermined value "2", an affirmative decision (YES) is obtained in step S9. In this case, the control flow goes to steps S11 and S12, in which the first and second nominal control targets determined in steps S7 and S8 are used as final control targets, according to which the brake forces applied to the right and left drive wheels 16, 14 are controlled. Namely, the solenoid-operated flow restrictor valve and directional control valve 114, 116 are controlled in the pressure control modes determined in steps S7 and S8, so as to regulate pressures in the rear wheel cylinders 44, 42.

If the difference between the identification numbers of the first and second nominal control targets exceeds the predetermined value "2", a negative decision (NO) is obtained in step S9. In this case, step S9 is followed by step S10 in which the nominal control target for one of the drive wheels 14, 16 which has a low slipping tendency is changed to another control target (another pressure control mode) which is closer to the nominal control target for the other drive wheel (which has a comparatively high slipping tendency). This newly determined nominal control target is used as the final control target for the low slipping tendency drive wheel, in step S11 or S12. Described in more detail, one of the pressure control modes selected in steps S7 and S8, which has the larger identification number (which is closer to the fast decrease mode FD) is replaced by another pressure control mode as a final control target, which is closer to the pressure control mode selected for the other drive wheel. In this embodiment, the final control target is determined so that the difference between the numbers of the final control targets for the two drive wheels is equal to the predetermined value "2". Accordingly, if the difference between the numbers of the nominal control targets (pressure control modes) selected in steps S7 and S8 is equal to "3", the number of the final control target for the low slipping tendency drive wheel is larger by "1" than the number of the nominal control target. If the above difference is equal to "4", the number of the final control target is larger by "2" than the number of the nominal control target. For instance, if the pressure control modes for the drive wheels 14 and 16 are FU (identification number "1") and SD (identification number "4"), respectively, the initially selected mode SD (determined in step S7) for the low slipping tendency drive wheel 16 is replaced in step S10 by the pressure hold mode H (identification number "3") as the final control target. In steps S11 and S12, the pressures in the wheel cylinders 44, 42 for the rear drive wheels 16, 14 are controlled in the finally determined control modes (final control targets). If the final control mode for the right rear wheel 16 is determined in step S10 by replacing the initially selected mode by another, this newly determined control mode is used in step S11. In this case, the control mode determined in step S8 is used in step S12.

Thus, the determination of the final control target or control mode for the low slipping tendency wheel in step S10 is implemented such that the difference between the numbers of the two final control modes for the two drive wheels 14, 16 is equal to "2", so that the difference between the two final control modes used in steps S11 and S12 is smaller than the difference between the two control modes as selected in steps S7 and S8 as the nominal control targets. However, there exists the predetermined difference "2" between the two final control modes (final control targets). This arrangement assures an optimum compromise between the avoidance of excessive slipping of the drive wheels and the avoidance of excessive brake application to the drive wheels or avoidance of excessive reduction in the vehicle acceleration, irrespective of the road surface and other conditions. If the difference between the two final control modes or target is excessively small, the drive force to accelerate the comparatively low slipping drive wheel is unnecessarily limited. If the difference is excessively large, on the other hand, the slipping tendency of the low slipping tendency drive wheel is increased. In view of these inconveniences, the difference between the two finally used control modes is suitably determined ("2" in this case), and the two finally used control modes are determined so as to maintain this optimum difference. Accordingly, the wheel acceleration slip control arrangement in the present embodiment of the invention suffers from neither the application of an unnecessarily high brake force to the low slipping tendency drive wheel, nor an excessive degree of slipping of the drive wheels or failure of suitably reducing or eliminating the slipping conditions of the drive wheels.

It will be understood from the above description that the present embodiment which uses the five different pressure control modes for the wheel cylinders 42, 44 is adapted to inhibit a decrease in the pressure in the wheel cylinder for the low slipping tendency wheel, if the fast increase mode is selected for the other drive wheel (for the comparatively seriously slipping drive wheel).

Referring to the graph of FIG. 7, there is illustrated an example of an operation to apply brakes to the wheel cylinders 42, 44 so as to reduce the slipping conditions of the drive wheels 14, 16, where the right rear wheel 16 slips before the left rear wheel 14, due to excessive acceleration of the wheels. The graph shows changes with time, in the rotating speeds and acceleration values of the drive wheels 14, 16, the control modes (targets), and the pressures in the wheel cylinders 42, 44.

After the execution of steps S11 and S12, the CPU 140 determines in step S13 whether the slipping conditions of the two rear drive wheels 14, 16 have been eliminated, more precisely, whether the slipping conditions have been reduced below a predetermined limit. For instance, this determination is achieved by comparing the rotating speeds Vrr, Vrl with the reference speed Vt3, and determining whether or not the time duration during which the speeds Vrr, Vrl are both lower than the reference speed Vt3 exceeds a predetermined value, for example, one second. If the result of the determination is affirmative, the CPU 140 determines that the slipping conditions have been eliminated, that is, an affirmative decision (YES) is obtained in step S13. In this case, step S14 is implemented to perform an operation necessary to cancel the slip restriction braking mode, namely, to open the solenoid-operated shut-off valve 54, deenergize the solenoid-operated flow restrictor and directional control valves 114, 116, and reset the WHEEL ACCELERATION SLIP flag F of the RAM 144.

If step S13 reveals that the slipping conditions have not been eliminated, then the control flow goes back to the main control routine. When step S4 is executed next, an affirmative decision (YES) is obtained, and the control flow goes to steps S7, S8 and S9, skipping steps S5 and S6. It is noted that step S9 is executed with respect to the nominal control targets (pressure control modes) which have been determined in steps S7 and S8. That is, the final control target obtained last in step S10 for the low slipping tendency drive wheel 14, 16 is not used in step S9.

If the difference between the identification numbers of the control modes for the left and right rear wheels 14, 16 is equal to or smaller than "2", an affirmative decision (YES) is obtained in step S9, and the control flow goes to steps S11 and S12, skipping steps S11 and S12, whereby the pressures in the wheel cylinders 44, 42 for the drive wheels 16, 14 are controlled in the modes as determined in steps S7 and S8. If step S5 is executed while the slipping conditions do not exist, a negative decision (NO) is obtained in step S5, and the control flow goes back to the main control routine.

It will be understood from the foregoing description that the present embodiment of the wheel acceleration slip control apparatus of the invention includes: slip detecting means constituted principally by the wheel speed sensors 84, 86, 88, 90, arithmetic and logic unit 92, a portion of the ROM 142 storing a control program for executing steps S1–S5, and a portion of the CPU 140 for executing these steps S1–S5; target determining means constituted principally by a portion of the ROM 142 storing a control program for executing steps S7–S10 and a portion of the CPU 140 for executing these steps S7–S10; and brake control means constituted principally by wheel acceleration slip control valve 100, a portion of the ROM 142 storing a control program for executing steps S11 and S12, and a portion of the CPU 142 for executing these steps S11 and S12.

The step S10 of the illustrated embodiment is adapted such that the final control target for the less slipping tendency drive wheel 14, 16 is determined so that the difference between the identification numbers of the final control targets (pressure control modes) for the two drive wheels 14, 16 is equal to the predetermined value "2". However, this difference may be larger than the predetermined value. For example, if there are provided six control targets corresponding to respective six different slipping conditions of the drive wheels, the final control target for the low slipping tendency drive wheel may be determined by subtracting a predetermined number ("2", for example) from the identification number of the nominal control target. The difference between the identification number of the thus determined final control target for the low slipping tendency drive wheel and that for the other drive wheel may be larger than, equal to, or smaller than a predetermined number ("2", for example as in the above embodiment). In the first two cases, the final control target for the low slipping tendency drive wheel is determined as obtained by the subtraction indicated above. In the third case, the final control target is determined so that the difference is equal to the predetermined number. This arrangement also provides reduction in the difference between the two final control targets, as compared with the difference between the two nominal control targets, and is effective to avoid excessive slipping of the drive wheels and insufficient acceleration of the vehicle.

Figure 8:
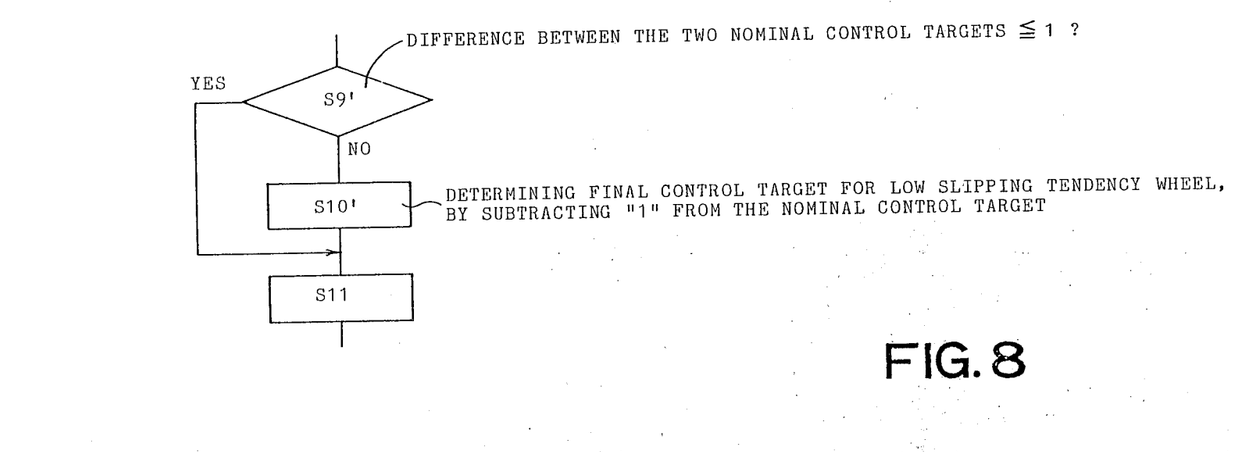
FIG. 8 is a view illustrating a part of a modified wheel acceleration slip control routine according to another embodiment of the invention.

The above arrangement may be modified, as illustrated in FIG. 8, such that the final control target for the low slipping tendency drive wheel is obtained by subtracting "1" from the nominal control target (step S10'), as long as the difference between the two nominal control targets is larger than "1" (step S9'). If the difference is equal to "1", or if an affirmative decision (YES) is obtained in step S9', the control flow goes to step S11 whereby the nominal control target obtained in step S7 or S8 is used as the final control target.

While the illustrated embodiments of FIGS. 6 and 8 are adapted such that step S10 or S10' is executed only where the negative decision (NO) is obtained in step S9 or S9' (only where the difference between the identification numbers of the nominal control targets or control modes is larger than the predetermined value of "2" or "1"), it is possible that the nominal control target as obtained in step S7 or S8 for the low slipping tendency drive wheel is replaced by a modified control target, even where the affirmative decision (YES) is obtained in step S9 or S9' (even where the difference between the numbers of the two nominal control targets is equal to or smaller than the predetermined value). In this case, however, the difference between the final control targets for the two drive wheels should be smaller than that in the case where the negative decision is obtained in step S9 or S9'.

It is also noted that the control targets for controlling the right and left wheel brakes so as to reduce or eliminate the slipping conditions of the drive wheels are given in the form of the pressure control mode in which the pressure in the wheel cylinder 42, 44 for the low slipping tendency drive wheel 14, 16 is controlled (i.e., rapidly increased, slowly increased, maintained, slowly decreased or rapidly decreased). However, the control targets may be given in the form of a specific brake pressure in the appropriate wheel cylinder 42, 44. In this case, the nominal target brake pressure for the low slipping tendency drive wheel is determined in a step corresponding to step S7 or S8, and this nominal target brake pressure is replaced by an elevated final brake pressure determined in a step corresponding to step S10 or S10' if the difference between the nominal target brake pressures is larger than a predetermined amount.

In the illustrated embodiments, the nominal control targets or pressure control modes are once determined in steps S7 and S8 according to the data table of FIG. 6, and the nominal control target for the low slipping tendency drive wheel is then replaced by the final control target in step S10 (S10') under the given condition (step S9, S9') while the nominal control target as determined in step S7 or S8 is used as the final control target for the other drive wheel. In the data table of FIG. 6, the pressure control modes FU, SU, H, SD and FD as the control targets correspond to the combinations of the ranges of the actually detected speeds and acceleration values of the drive wheels. However, the two final control targets for the two drive wheels may be determined directly from the detected slipping conditions of the two drive wheels, namely, based on a suitably prepared relationship between the final control targets and the detected speed and acceleration value combinations.

In the illustrated embodiments, the slipping conditions of the drive wheels are determined based on both the speeds and the acceleration values of the drive wheels. However, the slipping conditions may be determined based on a single parameter such as the amount or ratio of slip or the rotating speed of each drive wheel.

Although the brake control means used in the illustrated embodiments for controlling the pressures in the wheel cylinders 42, 44 so as to reduce the slip of the drive wheels 14, 16 employs the wheel acceleration slip control valve 100 incorporating the variable-volume unit 110, the pressures in the wheel cylinders may be directly controlled or controlled by other suitable means.

It will be understood that the concept of the wheel acceleration slip control according to the present invention may apply to a vehicle brake system which is not provided with an anti-lock control device, or may apply to a brake system for a front-drive vehicle having front drive wheels, or a four-wheel drive vehicle having four drive wheels.

It will also be understood that the present invention may be embodied with various other changes, modifications and improvements, which may occur to those skilled in the art, without departing from the spirit and scope of the invention defined in the following claims.

What is claimed is:

1. A wheel acceleration slip control apparatus for a vehicle, for applying brakes to right and left drive wheels of the vehicle upon detection of an excessive slip of the drive wheels, comprising:

a right and a left wheel brake for applying brake to said right and left drive wheels, independently of each other;

slip detecting means for detecting slipping conditions of said right and left drive wheels, upon acceleration of said drive wheels;

target determining means for determining a first and a second control target for controlling said right and left wheel brakes so as to reduce degrees of slip of said right and left drive wheels, respectively, depending upon the slipping conditions of said right and left drive wheels detected by said slip detecting means, respectively;

brake control means for operating said right and left wheel brakes according to said first and second control targets determined by said target determining means, respectively; and said target determining means determining said first and second control targets, each based on nominal control targets which correspond to the slipping conditions of the right and left drive wheels detected by said slip detecting means, said target determining means determining one of said first and second control targets for one of the drive wheels which has a low slipping tendency, such that said nominal control target of said one drive wheel is changed to a final control target which is closer to the nominal control target of the other drive wheel so that a first difference between said final control target of said one drive wheel and said nominal control target of said other drive wheel is not smaller than a predetermined amount, in a first case where a second difference between said nominal control target of said one drive wheel and said nominal control target of said other drive wheel exceeds said predetermined amount, said target determining means determining, in a second case where said second difference is equal to or smaller than said predetermined amount, said one of the first and second control targets such that said first difference is smaller than that in said first case, said target determining means using said final control target of said one drive wheel and said nominal control target of said other drive wheel as said one and the other of said first and second control targets.

2. A wheel acceleration slip control apparatus according to claim 1, wherein said target determining means determines said first and second control targets, each by selecting one of a plurality of stepped control targets which are numbered consecutively in the order of an effect of reducing the degrees of slip of said drive wheels when said stepped control targets are used, said target determining means determining, in said first and second cases, said one of the first and second control targets such that one of the stepped control targets as the nominal control target of said one drive wheel is replaced by another of said stepped control targets of said one drive wheel as said final control target which is closer to said stepped control target of said other drive wheel, such that said first difference is equal to a difference between numbers of said another stepped control target of said one drive wheel and said stepped control target of said other drive wheel and such that said first difference is not smaller than a predetermined value as said predetermined amount, said second difference being equal to a difference between the numbers of said stepped control targets of said one drive wheel and said other drive wheel, said target determining means using said another stepped control target of said one drive wheel as said one of the first and second control targets.

3. A wheel acceleration slip control apparatus according to claim 2, wherein said plurality of stepped control targets are five brake pressure control modes in which a pressure in a cylinder of each of said right and left wheel brakes is regulated, said five brake pressure control modes consisting of a fast increase mode, a slow increase mode, a pressure hold mode, a slow decrease mode and a fast decrease mode, which modes are numbered consecutively in the order of description.

4. A wheel acceleration slip control apparatus according to claim 3, wherein said slip detecting means comprise wheel speed sensing means for detecting rotating speeds of said drive wheels, wheel acceleration sensing means for detecting acceleration values of said drive wheels, and means for classifying each of the detected rotating speeds and acceleration values so as to fall in one of a plurality of ranges, said slip detecting means detecting said slipping conditions of each of said drive wheels, as a plurality of combinations of the ranges of the detected rotating speed and acceleration value of said each drive wheel, said target determining means comprising means for selecting one of said five brake pressure control modes, depending upon one of said combinations which is detected by said slip detecting means.

5. A wheel acceleration slip control apparatus according to claim 3, wherein said target determining means selects, as said one of the first and second control targets, one of said five brake control modes other than said decrease modes, when the other of said first and second control targets is said fast increase mode.

6. A wheel acceleration slip control apparatus according to claim 5, wherein said predetermined amount is defined by a difference between the numbers of two of said five brake pressure control modes, said predetermined amount being equal to "2".

7. A wheel acceleration slip control apparatus according to claim 1, wherein said target determining means determines said one of the first and second control targets such that said first difference in said second case is zero.

8. A wheel acceleration slip control apparatus according to claim 1, wherein said target determining means determines said one of the first and second control targets in said first case such that a third difference between said nominal control target and said final control target of said one drive wheel is a fixed amount not smaller than said predetermined amount.

9. A wheel acceleration slip control apparatus according to claim 1, wherein said target determining means determines said one of the first and second control targets such that said first difference is equal to said predetermined amount.

10. A wheel acceleration slip control apparatus according to claim 1, wherein said target determining means comprises means for first determining said nominal control target of said one drive wheel, and then replacing the determined nominal control target with said final control target as said one of the first and second control targets which is used for said one drive wheel.

* * * * *